R. S. REED.
VEHICLE TIRE.
APPLICATION FILED JULY 5, 1919.

1,346,336.

Patented July 13, 1920.
3 SHEETS—SHEET 1.

INVENTOR.
RICHARD S. REED.
BY Carey S. Frye
ATTORNEY.

R. S. REED.
VEHICLE TIRE.
APPLICATION FILED JULY 5, 1919.

1,346,336.

Patented July 13, 1920.
3 SHEETS—SHEET 2.

INVENTOR.
RICHARD S. REED.

BY Carey S. Frye
ATTORNEY.

INVENTOR.
RICHARD S. REED
BY Carey S. Frye
ATTORNEY

UNITED STATES PATENT OFFICE.

RICHARD S. REED, OF KOKOMO, INDIANA.

VEHICLE-TIRE.

1,346,336.     Specification of Letters Patent.     Patented July 13, 1920.

Application filed July 5, 1919. Serial No. 308,795.

*To all whom it may concern:*

Be it known that I, RICHARD S. REED, a citizen of the United States, residing at Kokomo, in the county of Howard and State of Indiana, have invented certain new and useful Improvements in Vehicle-Tires, of which the following is a specification.

This invention relates to vehicle tires and is adapted primarily for use in connection with automobiles and trucks, although it will be understood that the same may be used in connection with any vehicle requiring this form of tire.

The prime feature of the invention is the provision of a plurality of air cushion sections arranged in series, and these cushion sections may be made integral with each other, or separately and then combined and built up into a tire.

A further feature of the invention is in so arranging the series of cushion sections that the traction strain will be resisted in all directions thereby preventing undue yielding of the tire when in use, although the natural resiliency of the tire will not be affected.

A further feature of the invention is in so arranging the series of cushion sections that when properly built up and surrounded with a tread and casing substance, a complete concrete tire structure will be produced, and one that will be sufficiently air cushioned to produce easy riding, although it is not inflated, as is common.

Other objects and advantages will be hereinafter more fully set forth and pointed out in the accompanying specification.

In the accompanying drawings which are made a part of the application,

Figure 1:
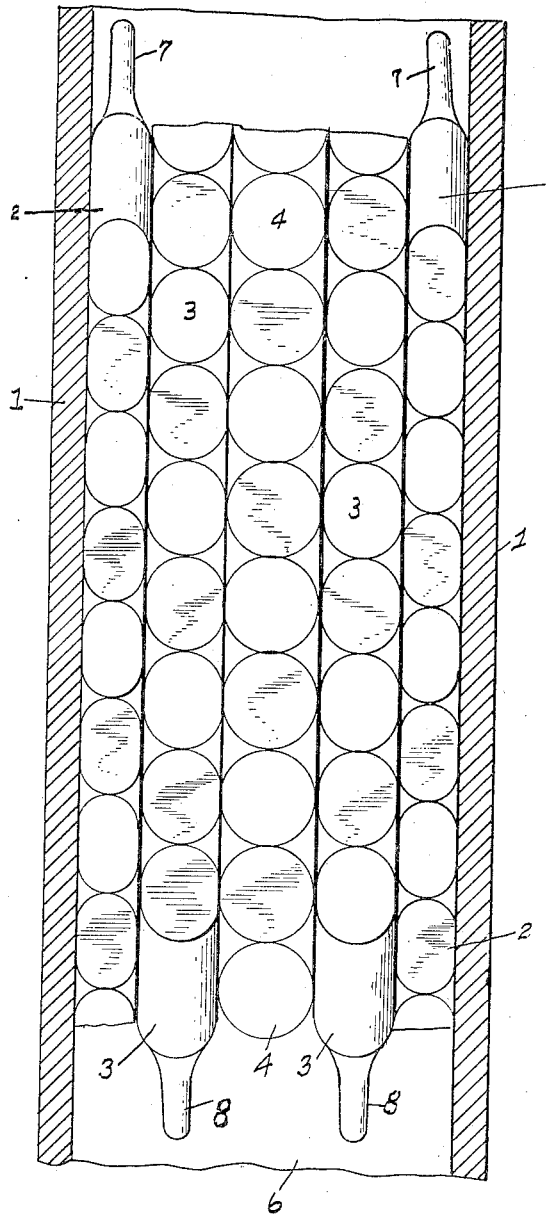
Figure 1 is a top plan view of a tire with the tread surface thereof removed.
Figure 2:
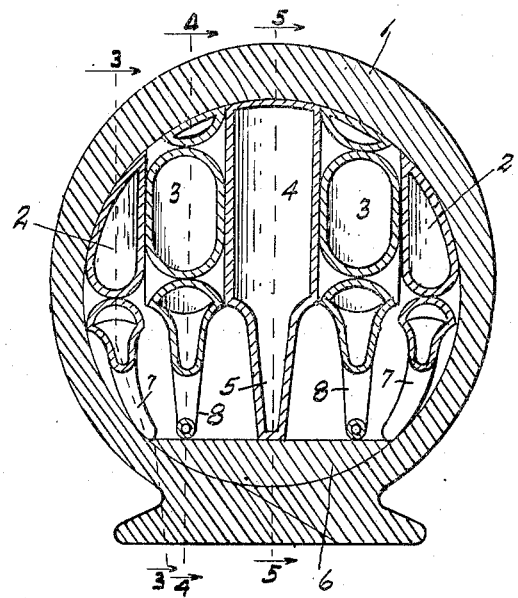
Fig. 2 is a transverse sectional view through the tire as seen on line 2—2, Fig. 3.
Figure 3:
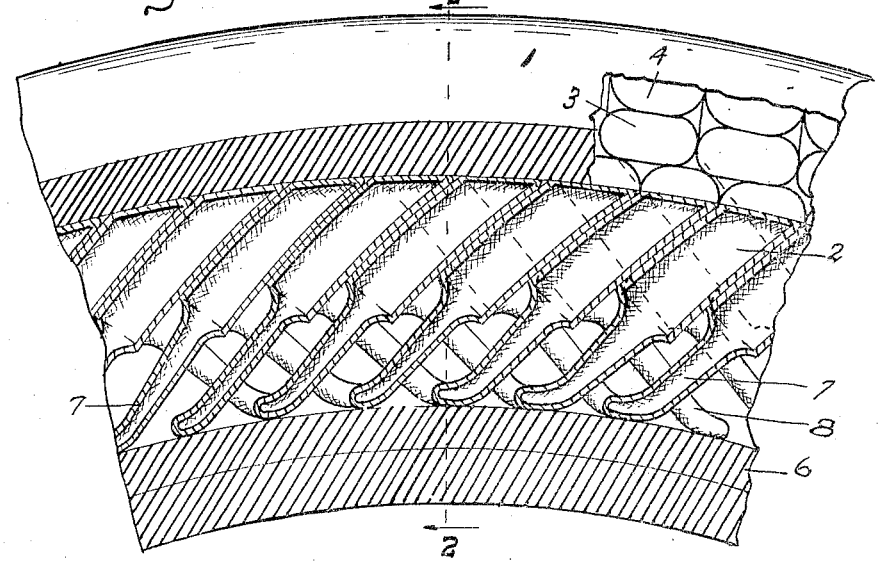
Fig. 3 is a sectional view as seen on line 3—3, Fig. 2, with parts broken away.
Figure 4:
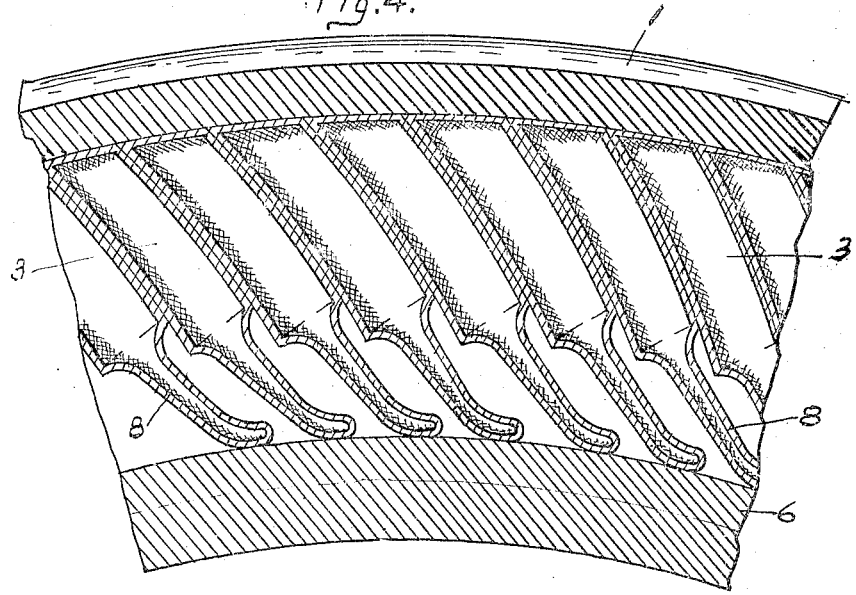
Fig. 4 is a sectional view as seen from line 4—4, Fig. 2.
Figure 5:
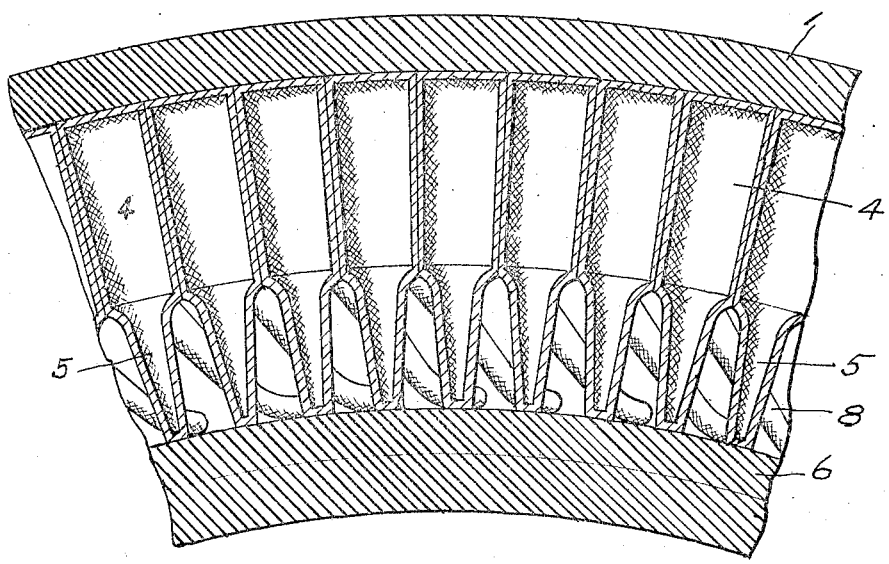
Fig. 5 is a sectional view as seen on line 5—5, Fig. 2.

Referring to the drawings in which similar reference numerals designate corresponding parts throughout the several views, 1 indicates a casing which may be built up in any preferred manner, said casing being built around a plurality of series of cushion sections 2, 3 and 4, there preferably being two series of the sections 2 and 3, while there is preferably but one series of the sections 4.

These sections are hollow and preferably air tight, so that such air as is inclosed in the hollow section will form a cushion, the cushioning effect obtained being substantially the same as when the tire is inflated.

In arranging the cushion sections so as to resist strain, especially traction strain, the central series 4 of the sections radiate from the axis of the wheel, while the series of sections 2 and 3, on opposite sides of the central series, are arranged obliquely to the axis of the wheel, the sections 2 trending in one direction and the sections 3 in the opposite direction.

The sections 4 are preferably cylindrical in cross section and are each provided at its inner end with an extension 5, which may be made solid or hollow as desired, the inner ends of the extensions resting against a filler section 6, placed within the casing 1, at the base portion thereof, and if desired the ends of the extensions may be vulcanized to the filler section, while the filler section is likewise vulcanized to the remainder of the casing.

The side sections 2 and 3 are likewise preferably tubular, but somewhat flattened so as to conform to the shape of the casing when assembled, these sections also having extensions 7 and 8 respectively, which may be solid or hollow as desired and the inner ends thereof are preferably vulcanized to the filler section 6, and as one set of these extensions trend obliquely in one direction and the other set trend obliquely in the opposite direction, the traction strain is compensated for and the casing held against undue contraction.

The meeting faces of the sections 2 and 3 and also the meeting faces of the sections 3 and 4 and the adjacent sections of each series are preferably vulcanized or otherwise secured together so that when a direct end pressure is applied to the sections 4, the drag occasioned by attaching the sections 3 thereto, together with the sections 2, which are secured to the sections 3, will aid the sections 4 in resisting the pressure on the tread of the casing. Likewise, the securing of the sections together along their meeting faces prevents undue side movement of the tire.

As previously stated, the cushioning sections and the casing may be molded or constructed integral, but the sections 2, 3 and 4 are preferably formed separately and when properly assembled, secured together by vulcanizing, and any suitable covering may be placed around the assembled series of sections to hold them in position while the casing is being built around the sections.

The casing is constructed in any preferred manner, and by adding the filler section 6, the casing is materially reinforced and a solid base provided for the attachment of the extensions of the cushioning sections.

By building up a tire in this manner, a cheaper grade of material may be used if desired and at the same time produce a tire that will stand wear as well as a pneumatic tire while the cost is reduced to a minimum. Likewise the cushioning effect will be practically the same as when the tire is inflated, owing to the amount of air inclosed in the cushioning sections.

The invention claimed is:

1. A vehicle tire including a central series of air tight cushioning sections, and series of cushioning sections on opposite sides of the central series and extending obliquely from their inner ends to the tread portion of the tire structure.

2. A vehicle tire including a series of radially disposed cushioning sections, series of cushioning sections on opposite sides of the first series of sections and extending obliquely from their inner ends to the tread portion of the tire structure, and a casing surrounding all of said cushioning sections.

3. A vehicle tire including a series of radially disposed cushioning sections, two or more series of cushioning sections on opposite sides of the first series of sections, the latter series of sections extending obliquely from their inner ends to the tread portion of the tire structure and alternate series trending in opposite directions.

4. A vehicle tire including a plurality of hollow radially arranged cushioning sections, a plurality of hollow cushioning sections on opposite sides of the first set of sections and extending obliquely from their inner ends to the tread portion of the tire structure, and a casing inclosing said sections.

In testimony whereof I hereunto affix my signature.

RICHARD S. REED.